Patented Feb. 24, 1931

1,794,084

UNITED STATES PATENT OFFICE

MARTIN LUTHER, OF MANNHEIM, AND WILHELM PUNGS, ROBERT GRIESSBACH, AND CLAUS HEUCK, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF CONDENSATION PRODUCTS OF UREA AND FORMALDEHYDE

No Drawing. Original application filed September 8, 1926, Serial No. 134,251, and in Germany October 16, 1925. Divided and this application filed March 27, 1928. Serial No. 265,218.

The subject-matter of the present application has been divided out from our copending application Ser. No. 134,251, filed September 8th, 1926.

The present process relates to the hardening of condensation products of urea and formaldehyde.

In the production of shaped articles from the viscous condensation products of urea and formaldehyde and their derivatives, we have found certain improvements increasing the speed of hardening. The term "viscous" is meant to comprise also such condensation products of the said kind which have already gelatinized i. e. such products as have already solidified to such a degree that they cannot any more be poured, but retain their shape though they are still soft. It is well known that the masses remain soft and adhesive for a considerable time, and it has already been proposed to increase the speed of the hardening process by exposing the masses for several hours to elevated temperatures.

We have found that hardening proceeds much more rapidly by treating the articles with sulfur dioxid. The surfaces exposed to this treatment rapidly get rid of their adhesiveness and are covered with a hardened layer, the thickness of which depends on the time and strength of the action. The sulfur dioxid may be employed in the gaseous state with or without the aid of elevated pressure or in the form of a solution. When working with aqueous solutions, the surfaces of the articles become often slightly opaque, which drawback, though of no importance, in many cases, may be overcome by the employment of gaseous sulfur dioxid or of non-aqueous solutions. The surfaces hardened by this process are very stable, and the articles do not swell so much when in contact with liquids.

As by this invention it is possible to harden the condensation products very rapidly, the said products become much more suitable for the purposes for which they have hitherto been employed. Further they are now applicable for many purposes for which they could not be used up to now by reason of their adhesiveness. For example they may be employed for the production of artificial fibres which are distinguished over the fibres hitherto known, for instance articial silk, by being non-inflammable. The rapid hardening of the surfaces is of particular advantage when the condensation products are employed for glass-like articles, as insulating materials, for lacquers, films and the like.

By combining the hardening by sulfur dioxid with the hardening by elevated temperatures, the time necessary for hardening may be further diminished, and the hardness obtained may be increased and varied within wide limits.

Instead of sulfur dioxid, any other acids or acid anhydrides may be employed, and among these volatile compounds are especially suitable. The hardening effect obtained may vary depending on the kind and concentration of the acid or anhydride employed and on the method by which the condensation product of urea and formaldehyde has been produced. Also the time for which the acid or anhydride acts on the condensation product, is of considerable influence on the hardening operation. It is possible to produce only a hard surface or coating or to harden the product more or less throughout the whole mass, as desired. With the acid or anhydride suitably chosen, the condensation products remain clear when they were so before the treatment. The acids or anhydrides may be employed in the gas or vapor state or in the form of a solution in water or other solvents. The treatment may be carried out, if desired, under elevated or diminished pressure.

*Example 1*

6 kilograms of urea, 200 grams of monosodium phosphate and 50 grams of di-sodium phosphate are dissolved in 5 litres of water while heating. The solution is slowly added to 18.75 kilograms of a 32 per cent formaldehyde solution. After evaporating the bulk of the water, the highly viscous condensation product is poured on a smooth plate and exposed to an atmosphere of sulfur dioxid. After some minutes, a hard superficial layer, which is no longer adhesive, has been formed. In case the plate of the condensation product has a greater thickness, it may be advantageous to employ a subsequent hardening by heat.

Example 2

A fibre prepared in a similar manner as is usual in the industry of artificial silk from a condensation product obtained and concentrated according to Example 1 is passed through a hardening zone consisting of a warm atmosphere of sulfur dioxid, or through a hardening bath consisting for example of a solution of sulfur dioxid in acetone. It is hardened therein and may then be employed for example for textile fabrics and the like.

Example 3

An aqueous solution of 1 kilogram of urea, 25 grams of mono-sodium phosphate and 5 grams of di-sodium phosphate is caused to run into 3 kilograms of a boiling 32 per cent formaldehyde solution. By evaporating the water as far as possible in vacuo, a highly viscous mass is obtained which is poured into a casting-mould forming for example a prism. The mass is heated for several hours to 70° C., taken from the mould and exposed to an atmosphere of sulfur dioxid. After 12 to 24 hours the prism has become hard and is ready for further treatment or for use. Without the employment of sulfur dioxid, the hardening would take a much longer time.

Example 4

A viscous mass obtained by condensing urea and formaldehyde by any suitable method and evaporating the water, is brought as an insulating lacquer in a thin layer onto an article to be insulated. It is then treated with vapors of formic acid whereby it loses its adhesiveness and becomes hard.

Example 5

A viscous condensation product of urea and formaldehyde is brought into the mould of a lens and maintained at a temperature of 60° C. until it is sufficiently hard to be taken from the mould without changing its form. The comparatively weak lens is exposed for one day to gaseous hydrofluoric acid whereby it becomes so hard that it can be polished at once. The same result is obtained even with very weak masses by dipping the lens for a short time into aqueous hydrofluoric acid of 40 per cent strength.

What we claim is:

1. The process of hardening viscous, completely condensed condensation products of urea and formaldehyde which comprises acting on them with a compound selected from the group consisting of acids and acid anhydrides in addition to any acid agent which may have been incorporated with the said products in order to further condensation.

2. The process of hardening viscous, completely condensed condensation products of urea and formaldehyde which comprises acting on them with a compound selected from the group consisting of volatile acids and acid anhydrides in addition to any acid agent which may have been incorporated with the said products in order to further condensation.

3. The process of hardening viscous, completely condensed condensation products of urea and formaldehyde which comprises acting on them with sulfur dioxid.

In testimony whereof, we affix our signatures.

MARTIN LUTHER.
WILHELM PUNGS.
ROBERT GRIESSBACH.
CLAUS HEUCK.